(12) United States Patent
Um et al.

(10) Patent No.: US 7,496,279 B2
(45) Date of Patent: Feb. 24, 2009

(54) METHOD OF RECORDING DUBBING AUDIO DATA ONTO A REWRITABLE RECORDING MEDIUM

(75) Inventors: Soung Hyun Um, Anyang-si (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1112 days.

(21) Appl. No.: 10/321,373

(22) Filed: Dec. 18, 2002

(65) Prior Publication Data

US 2003/0118319 A1   Jun. 26, 2003

(30) Foreign Application Priority Data

Dec. 22, 2001   (KR) .................. 10-2001-0083250

(51) Int. Cl.
*H04N 7/00* (2006.01)
(52) U.S. Cl. ........................... 386/96; 386/105
(58) Field of Classification Search ............. 352/121, 352/137; 348/14.14, 22, 122, 231.99; 386/125, 386/124, 105, 106, 96, 46, 104
See application file for complete search history.

(56) References Cited

U.S. PATENT DOCUMENTS

| | | | |
|---|---|---|---|
| 6,115,035 A | | 9/2000 | Comton et al. |
| 6,122,436 A * | | 9/2000 | Okada et al. .............. 386/126 |
| 6,816,189 B2 | | 11/2004 | Nagaoka et al. |
| 6,999,674 B1 * | | 2/2006 | Hamada et al. .............. 386/95 |
| 7,107,516 B1 | | 9/2006 | Anderson et al. |
| 7,158,175 B2 | | 1/2007 | Belz et al. |
| 2001/0040862 A1 | | 11/2001 | Ando et al. |
| 2002/0135608 A1 | | 9/2002 | Hamada et al. |
| 2005/0063669 A1 * | | 3/2005 | Kato et al. .................. 386/69 |

FOREIGN PATENT DOCUMENTS

| | | |
|---|---|---|
| CN | 1263672 A | 8/2000 |
| CN | 1300022 A | 6/2001 |
| CN | 1310445 A | 8/2001 |
| CN | 1168093 C | 9/2004 |
| EP | 1 059 635 A2 | 12/2000 |
| EP | 1 107 103 A2 | 6/2001 |
| EP | 1 209 680 A1 | 5/2002 |
| JP | 9-97490 A | 4/1997 |

(Continued)

OTHER PUBLICATIONS

Japan Electronic Industry Development Association Standard, Dec. 1998, Version 1.0.

(Continued)

*Primary Examiner*—Robert Chevalier
(74) *Attorney, Agent, or Firm*—Birch, Stewart, Kolasch & Birch, LLP

(57) ABSTRACT

A recording medium and method for managing still pictures and related audio data are provided. The method includes managing still pictures and audio data related to the still pictures using a playlist. The playlist includes first navigation information for the audio data, and second navigation information for the still pictures. The first navigation information includes a file name of the audio data, and the second navigation information is provided by a playitem of the playlist.

23 Claims, 4 Drawing Sheets

FOREIGN PATENT DOCUMENTS

| | | |
|---|---|---|
| JP | 11-191282 A | 7/1999 |
| JP | 2000-4421 A | 1/2000 |
| JP | 2000-41212 A | 2/2000 |
| JP | 2000-287163 A | 10/2000 |
| JP | 2000-333126 A | 11/2000 |
| JP | 2001-157146 A | 6/2001 |
| JP | 2001-157155 A | 6/2001 |
| JP | 2001-169241 A | 6/2001 |
| JP | 2001-211418 A | 8/2001 |
| JP | 2001-216739 A | 8/2001 |
| KP | 1020000004856 A | 1/2000 |
| KR | 2000-0006198 A | 1/2000 |
| KR | 2001-0050627 A | 6/2001 |
| WO | WO-01/11626 A1 | 2/2001 |
| WO | WO-01/82604 A1 | 11/2001 |
| WO | WO-01/82605 A1 | 11/2001 |
| WO | WO-01/82606 A1 | 11/2001 |
| WO | WO-01/82608 A1 | 11/2001 |
| WO | WO-01/82609 A1 | 11/2001 |
| WO | WO-01/82610 A1 | 11/2001 |
| WO | WO-01/82611 A1 | 11/2001 |

OTHER PUBLICATIONS

Archos Jukebox Multimedia—MP3 & Movie Media box, Robert Menta, Dec. 14, 2001.

* cited by examiner

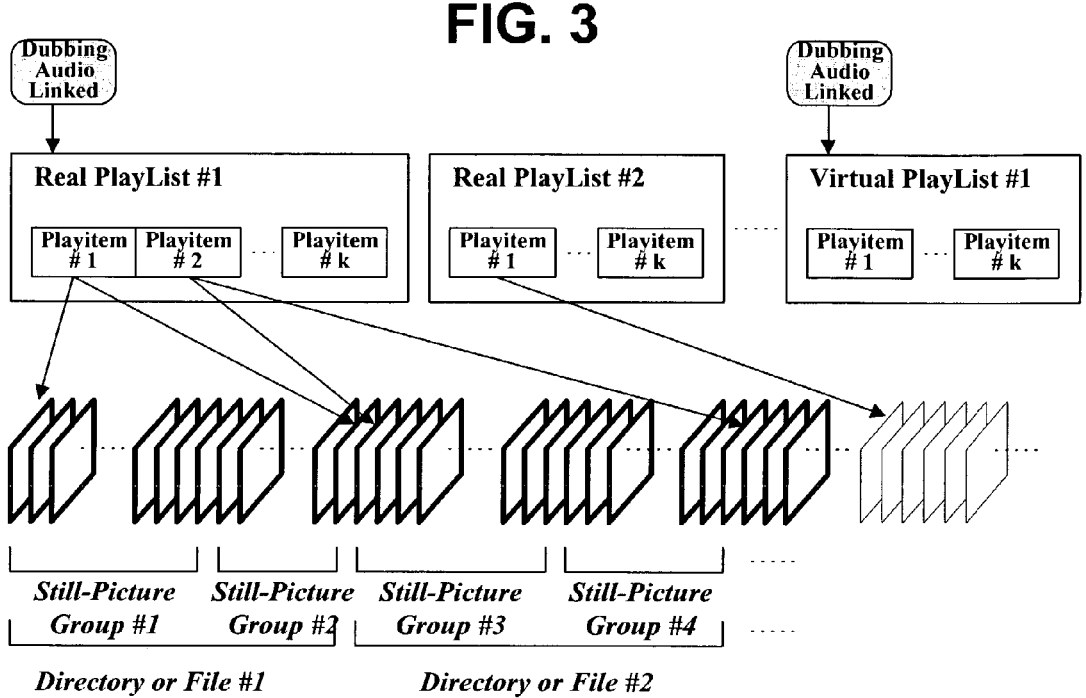
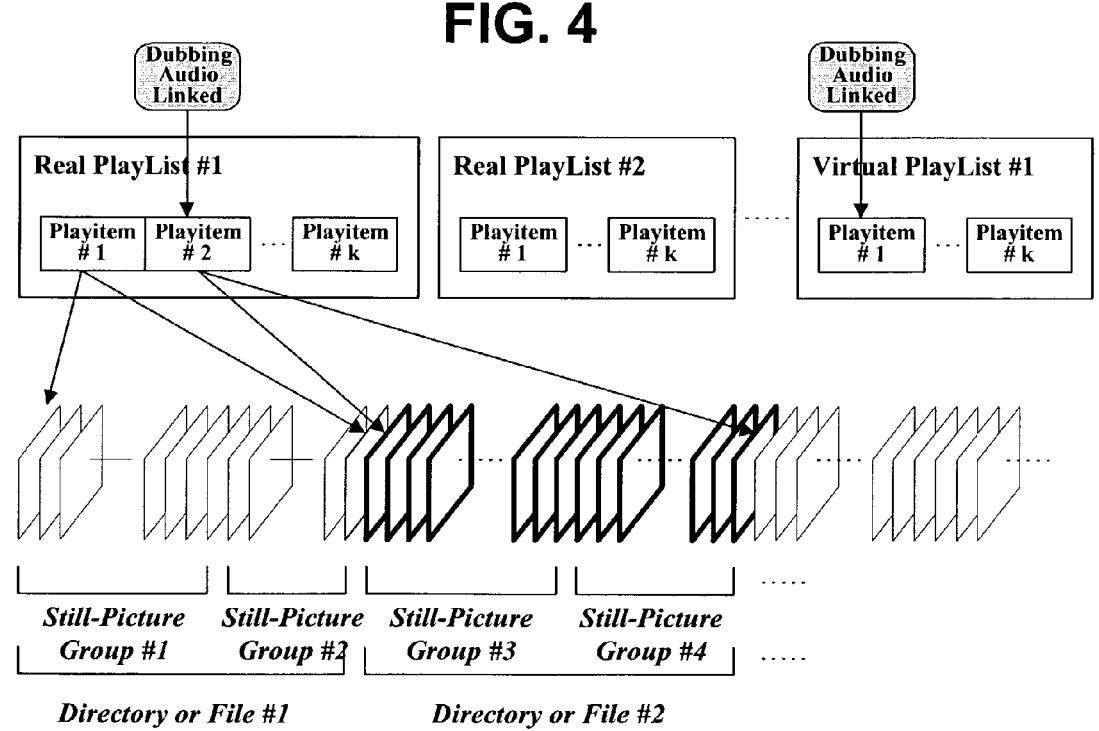

METHOD OF RECORDING DUBBING AUDIO DATA ONTO A REWRITABLE RECORDING MEDIUM

BACKGROUND OF THE INVENTION

1. Field of the Invention

The present invention relates to a method of recording dubbing audio in connection with recorded still pictures onto a recording medium, e.g., a rewritable DVD (Digital Versatile Disk).

2. Description of the Related Art

A disk-type recording medium such as a compact disk (CD) can store high-quality digital audio data permanently, so that it is a popular recording medium. A digital versatile disk (referred as 'DVD' hereinafter) has been developed as a new disk-type recording medium. A DVD can store much larger data than a CD, and thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

Recently, a Digital Still Camera (DSC) being capable of storing a taken picture in digital data has been developed. Such a DSC usually has a memory chip of large storage capacity so that it can take high-quality pictures and store audio data associated with the stored pictures as well. In a DSC, the taken pictures are encoded in the format of JPEG or TIFF while the audio data are encoded in the format of PCM, u-Law PCM, or IMA-ADPCM.

A DSC has a well-known file system called 'DCF' (Design rule for Camera File system) for recording still pictures and audio data. FIG. 1 shows an illustrative DCF. In the structure of DCF, a DCIM (Digital Camera IMages) directory exists under a root directory and many subdirectories may exist under the DCIM. Each subdirectory has 8-digit-long filename that is composed of three numeric digits and five character digits. The three numeric digits should be unique, for instance, one among 100-999, and the five character digits are arbitrarily chosen by a user. Because the three numeric digits are unique, the subdirectories can be created up to 900. A temporary directory named 'TEMP' is also under the DCIM.

A subdirectory, e.g., subdirectory '100ABCDE' of FIG. 1 can accommodate many data files of which filename is 8-digits long. The filename is composed of four numeric digits and four character digits. While the four character digits are chosen by a user, the four numeric digits should be unique among data files if their attributes are different. The data files are still picture and/or audio files, respectively. The still picture files have an extension of 'JPG' or 'TIF' while the audio files encoded by PCM, u-law PCM or IMA-ADPCM have an extension of 'WAV'. The filenames of the data files can be the same if their extensions are different. Therefore, when a picture file is to be dubbed with audio, a dubbed audio file can be linked with the picture file only if their filenames are made the same.

By the way, a disk video recorder (DVR), which has been developed recently, can record still pictures as well as motion pictures. If a DVR adopts its recording format and management information structure being able to improve compatibility of recorded still pictures and dubbing audio data with a DSC, a user can move or copy between a DVR and a DSC without any data conversion or any data converting tool. This will improve use convenience of the two electronic machines.

However, when adopting the recording format and management information structure to improve compatibility, a provisional DCR standard for motion picture recording must not be violated by the adoption.

SUMMARY OF THE INVENTION

It is an object of the present invention to provide methods that record still pictures in the format compatible with DSC recording format and accommodate dubbing audio for the recorded still pictures with management structure of motion picture recording format.

It is another object of the present invention to provide a recording medium and method for managing still pictures and related audio data effectively.

A method of recording dubbing audio data onto a rewritable recording medium in accordance with an aspect of the present invention comprises the steps of: recording onto a rewritable recording medium still picture data composed of at least one picture in a format compatible with a recording format of a DSC; recording dubbing audio data for a still picture section included in the recorded still picture data; and recording management information to link the recorded dubbing audio data to the section.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIGS. 3 to 8 are respective embodiments of recording dubbing audio data for recorded still picture data.

DETAILED DESCRIPTION OF THE PREFERRED EMBODIMENTS

In order that the invention may be fully understood, a preferred embodiment thereof will now be described with reference to the accompanying drawings.

Figure 2:
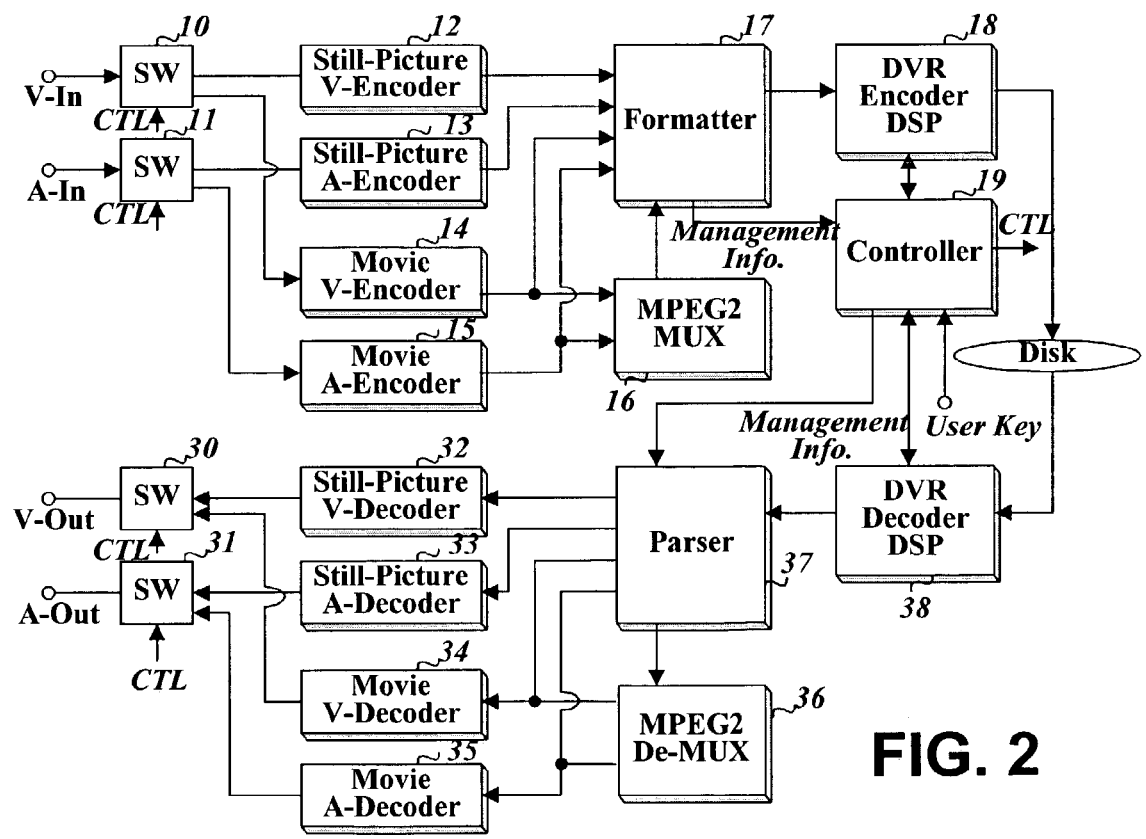
FIG. 2 is a block diagram of a disk device in which a method of recording dubbing audio onto a rewritable recording medium in accordance with the present invention is embedded.

FIG. 2 is a block diagram of a disk device in which a method of recording dubbing audio onto a rewritable recording medium in accordance with the present invention is implemented.

The disk device of FIG. 2, e.g., a DVR, can record video/audio data and management information for searching and reproduction control onto a rewritable recording medium.

The disk device comprises, as shown in FIG. 2, an input processing module, an output processing module, and a controller 19 conducting overall system control. The input processing module is composed of two input switching units 10 and 11, a still picture video encoder 12, a still picture audio encoder 13, a movie video encoder 14, a movie audio encoder 15, an MPEG 2 muxer 16, a formatter 17, and a DVR encoding DSP 18. The output processing module is composed of two output switching units 30 and 31, a still picture video decoder 32, a still picture audio decoder 33, a movie video decoder 34, a movie audio decoder 35, an MPEG 2 demuxer 36, a parser 37, and a DVR decoding DSP 38. All the components of the disk device are operatively coupled.

The two input switching units 10 and 11 selectively connect their input signals to the still picture video encoder 12 and the still picture audio encoder 13 or the movie video encoder 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized still picture video and/or audio data. The produced management information is delivered to the controller 19.

In case that the encoded motion picture video and audio data are inputted to the formatter 17 from the movie encoders 14 and 15 and the MPEG 2 stream is inputted to the formatter 17 from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

The DVD encoding DSP 18 constructs ECC (Error Correction Code) blocks with the successive data units having still or motion pictures and audio data and then modulates data of ECC blocks to corresponding recording waveforms that will form mark/space patterns on the surface of the rewritable recording disk. At this time, the controller 19 controls data recording of the DVR encoding DSP 18 in accordance with attribute of data being recorded. That is, the controller 19 determines recording location, file and directory to record data, and so on based on attribute of data being recorded. If needed, information entered by a user is used.

In addition, while or after video and/or audio data are recorded, the controller 19 records the management information received from the formatter 17 onto the rewritable recording disk through the DVR encoding DSP 18.

After still pictures are recorded, some pictures are grouped by a user's selection.

If audio data are inputted to be dubbed to a still picture or pictures selected by a user, the controller 19 creates and records management information to link the audio data with the associated picture or pictures after recording the inputted audio data onto the rewritable recording disk. For example, the controller 19 has the recorded audio data named the same as the picture or pictures and places the audio data under the same directory, and then creates and records necessary management information matched with the motion picture recording standard. The extension of the recorded audio data is determined in accordance with its encoded scheme. As aforementioned, the audio data may be encoded by one of u-Law PCM, AC-3, MPEG 1 layer 2, LPCM, and so forth.

Below described is a method of recording audio data to be dubbed to still picture data and management information thereof.

Figure 5:
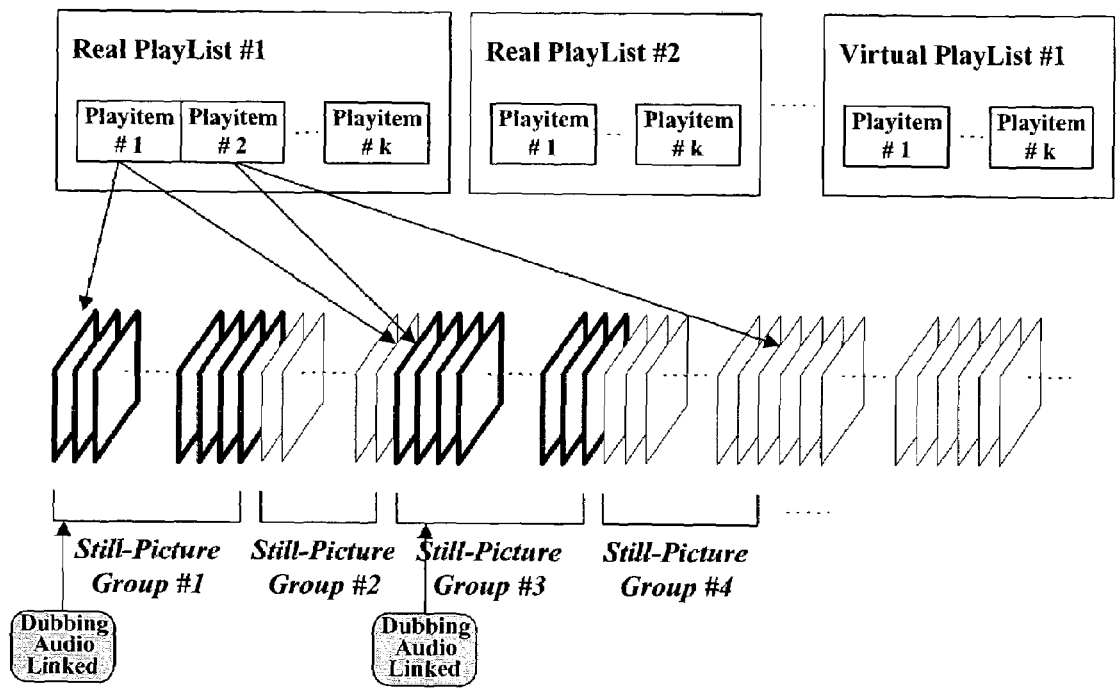
Figure 6:
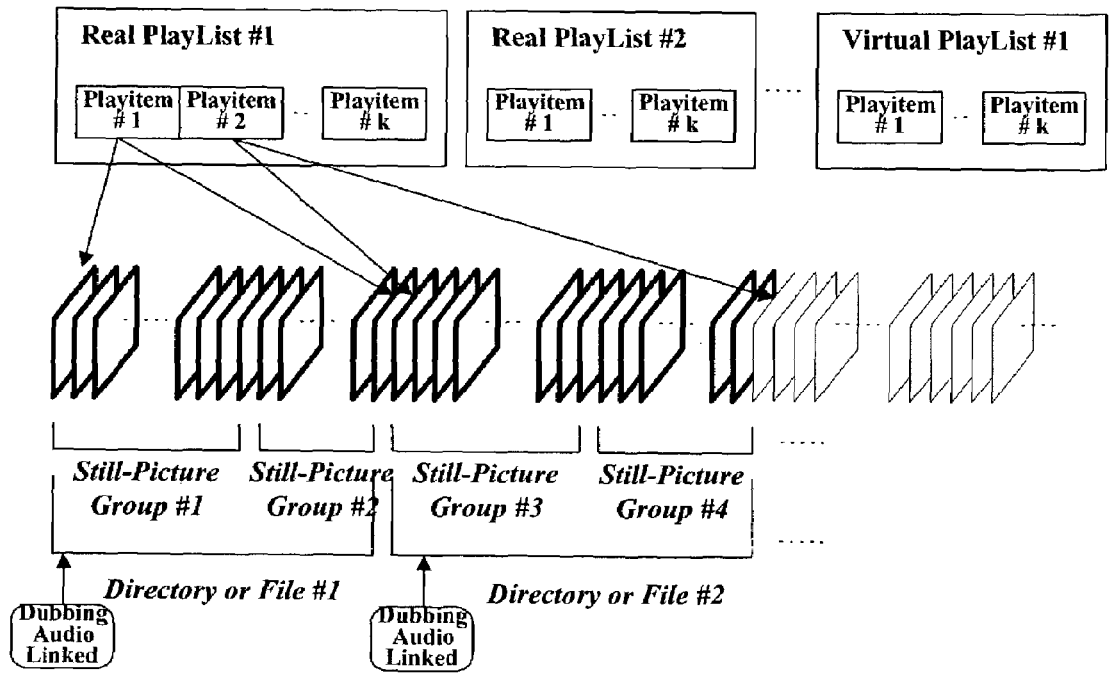
Figure 7:
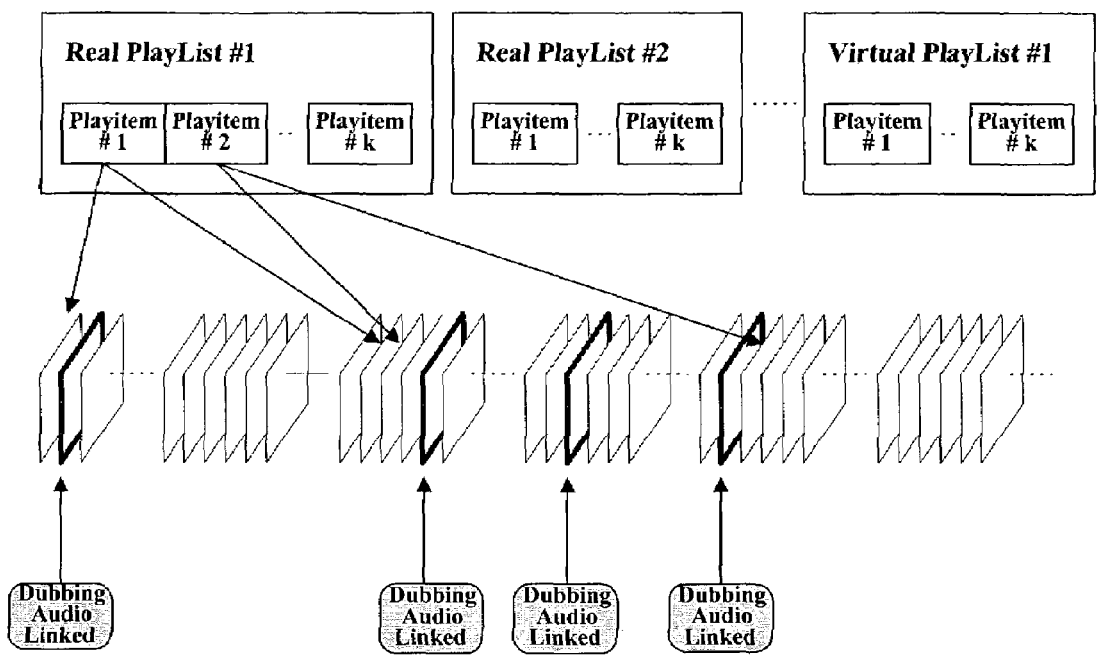

FIGS. 3 to 8 are respective embodiments of recording dubbing audio data for recorded still picture data. FIG. 3 illustrates the first embodiment that allows audio dubbing in a unit of playlist, namely, play navigation unit; FIG. 4 illustrates the second embodiment that allows audio dubbing in a unit of playitem included in a playlist; FIG. 5 illustrates the third embodiment that allows audio dubbing in a unit of picture group of same attribute; FIG. 6 illustrates the fourth embodiment that allows audio dubbing in a unit of file or subdirectory under DCIM directory; and FIG. 7 illustrates the fifth embodiment that allows audio dubbing in a unit of still picture.

Figure 8:
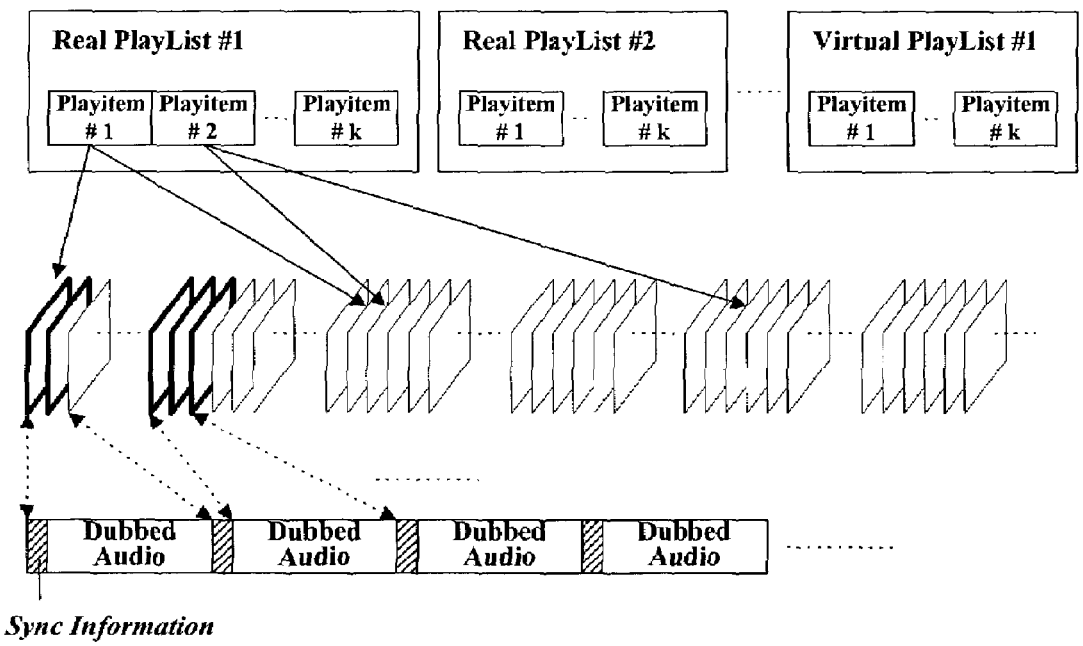

FIG. 8 shows another embodiment that records dubbing audio data along with synchronizing information to synchronize with respective pictures or picture groups. The embodiment illustrated in FIG. 8 is applicable to all embodiments of FIGS. 3 to 7.

Figure 1:
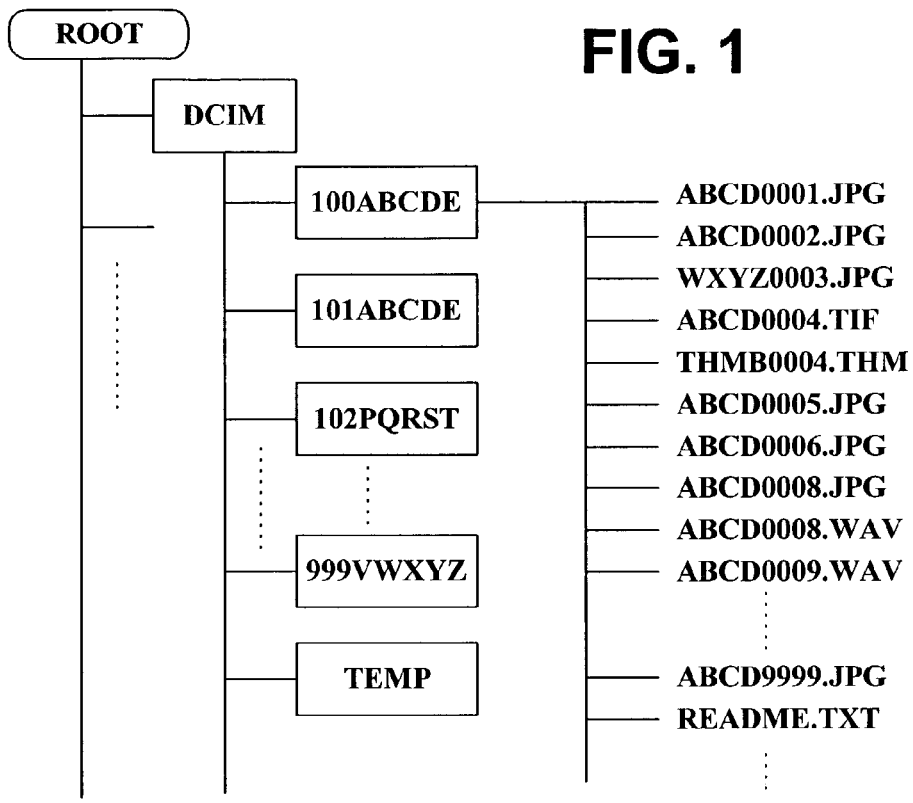
FIG. 1 is an illustrative DCF (Design rule for Camera File system) adopted by a digital still camera.

In order to dub audio data according to one of the five embodiments, the controller 19 records still pictures whose format is compatible with the recording format of a DSC, namely JPEG or TIFF format, first. Under the adopted DCF file system shown in FIG. 1, those still pictures are recorded under a chosen subdirectory, e.g., '100ABCDE' under the DCIM directory created under the root directory. Those still pictures are recorded in a single file or separate files. A part of the recorded still pictures are grouped if they have the same attribute(s), e.g., same picture resolution or same size. The pictures belonging to the same group may be located under the same subdirectory.

When audio data to be dubbed are received, the controller 19 has them encoded by MPEG 2, AC-3, LPCM, PCM, u-Law PCM, or IMA-ADPCM manner and then recorded onto the rewritable recording disk. After recording the dubbing audio data, the controller 19 creates management information to link the dubbing audio data with an object (playlist, playitem, group of still pictures, still picture, file, or subdirectory) selected in accordance with one of the specified dubbing rules, and records the created information.

In case of the playlist allowed mode where audio dubbing is allowed in a unit of playlist defining presentation order of still picture collections as shown in FIG. 3, the created management information is to link with a chosen real playlist defining presentation order of its picture collections as they are recorded or a chosen virtual playlist defining presentation order as edited by a user.

In case of the playitem allowed mode shown in FIG. 4, the created management information is to link to a chosen playitem included in a chosen playlist, the play item defining a presentation sequence of a picture collection.

The management information to link with a playlist or a playitem may include information to identify recorded audio data, e.g., recording location or filename, playlist— or play-item-identifying information, and attribute(s) of the recorded audio data.

In case of the picture-group allowed mode shown in FIG. 5, the created management information is to link with a chosen group of still pictures included in selected playitem and playlist. In case of the file or subdirectory allowed mode shown in FIG. 6, the created management information is to link to a chosen file or subdirectory.

The management information to link to a group of still pictures include start and end location of the group and attribute of the group, and may be written in a playitem containing the group. And, the management information to link to a file or a subdirectory includes file— or subdirectory-identifying information, e.g., filename or subdirectory name and may be also written in a playitem referring to that file or subdirectory.

In case of the individual picture allowed mode shown in FIG. 7, the created management information is to link with a selected still picture by a user. If a single picture is always corresponding to a single file, the management information includes a filename to link with. If a plurality of pictures are contained in a single file, the management information includes a location and size of a chosen picture. In this picture allowed mode, the management information may be included in a header of a still picture.

If a user requires to synchronize dubbing audio data with respective still picture sections (playlists, playitems, still picture groups, still pictures, files, directories) which will be presented along with dubbed audio, while recording encoded audio data continuously the controller 19 inserts sync information about a linked section in the recorded audio data each time a section to synchronize is changed by a user's command, as shown in FIG. 8.

The sync information includes appropriate information depending upon which type of object is to be synchronized. For example, in case that audio dubbing is allowed in a unit of picture or picture group, the sync information includes a start and end location of a targeted picture or group, or a serial number or filename of a targeted picture or the first picture of a targeted group, and audio playback time of a related audio data section. In case of playlist, playitem, or directory allowed mode, the sync information includes a serial number of a targeted object or directory name, and audio playback time of a related audio data section.

If presentation of still pictures is requested after completion of audio dubbing, the controller 19 searches for dubbed audio data linked with the requested playlist, playitem, group of still pictures, file, directory, or still picture based on the recorded management information. If found, the found dubbed audio data are presented with the requested still picture object. If dubbed audio data have been recorded as illustrated in FIG. 8, every linked picture or pictures are decoded out along during the presentation of dubbed audio sections through detecting and examining every sync information.

The above-explained method of recording dubbing audio data onto a rewritable recording medium in accordance with the present invention enables audio dubbing for various types of still picture sections as well as still picture files recorded under the file system adopted by a DSC, thereby improving use convenience of motion picture recorder and still picture camera.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of managing data, comprising:
   managing still pictures and audio data related to the still pictures using a playlist; and
   recording the still pictures and the audio data in separate files,
   wherein the playlist includes first navigation information for the audio data, and second navigation information for the still pictures,
   the first navigation information includes a file name of the audio data,
   the second navigation information is provided by one or more playitems of the playlist,
   the managing step includes linking the still pictures and the audio data by the first navigation information in the playlist, the first navigation information including playitem-identifying information for linking the first navigation information and the playitem,
   wherein the playlist includes a collection of playitems, each of the playitems being related to at least one still picture.

2. The method of claim 1, wherein the playlist further includes attribute information of the audio data.

3. The method of claim 1, wherein the separate files are stored on a recording medium.

4. The method of claim 3, wherein the recording medium is an optical disc.

5. The method of claim 1, wherein the playlist includes a collection of playitems, each of the playitems pointing to at least one still picture unit of the still pictures.

6. A method of managing still picture data, comprising:
   recording still picture data and audio data related to the still picture data in separate files;
   managing the still picture data and the audio data using a playlist,
   wherein the playlist includes first navigation information for the audio data, and second navigation information for the still picture data,
   the second navigation information is provided by one or more playitems of the playlist,
   the managing step includes linking the still pictures and the audio data by the first navigation information in the playlist, the first navigation information including playitem-identifying information for linking the first navigation and the playitem,
   wherein the playlist includes a collection of playitems, each of the playitems being related to at least one still picture.

7. The method of claim 6, wherein the first navigation information includes storage identification information of the audio data.

8. The method of claim 6, wherein the playlist further includes attribute information of the audio data.

9. The method of claim 6, wherein the separate files are stored on a recording medium.

10. The method of claim 9, wherein the recording medium is an optical disc.

11. The method of claim 6, wherein the playlist includes a collection of playitems, each of the playitems pointing to at least one still picture unit of the still picture data.

12. A computer-readable medium encoded with computer executable instructions comprising:
    still pictures recorded on the computer-readable medium;
    audio data related to the still pictures; and a playlist recorded on the computer-readable medium, for managing the still pictures and the audio data, the playlist including first navigation information for the audio data and second navigation information for the still pictures, the first navigation information including a file name of the audio data, and the second navigation information being provided by one or more playitems of the playlist, wherein the still pictures and the audio data are recorded in separate files on the computer-readable medium and are linked by the first navigation information in the playlist, the first navigation information including playitem-identifying information for linking the first navigation and the playitem, wherein the playlist includes a collection of playitems, each of the playitems being related to at least one still picture.

13. The medium of claim 12, wherein the playlist further includes attribute information of the audio data.

14. The medium of claim 12, wherein the computer-readable medium is an optical disc.

15. The medium of claim 12, wherein the playlist includes a collection of playitems, each of the playitems pointing to at least one still picture unit of the still pictures.

16. A computer-readable medium encoded with computer executable instructions comprising:

still picture data and audio data related to the still picture data, in separate files; and a playlist for managing the still picture data and the audio data, the playlist including first navigation information for the audio data, and second navigation information for the still picture data, and the second navigation information being provided by one or more playitems of the playlist, wherein the still pictures and the audio data are linked by in the first navigation information the playlist, the first navigation information including playitem-identifying information for linking the first navigation and the playitem, wherein the playlist includes a collection of playitems, each of the playitems being related to at least one still picture.

17. The medium of claim 16, wherein the first navigation information includes storage identification information of the audio data.

18. The medium of claim 16, wherein the playlist further includes attribute information of the audio data.

19. The medium of claim 16, wherein the computer-readable medium is an optical disc.

20. The medium of claim 16, wherein the playlist includes a collection of playitems, each of the playitems pointing to at least one still picture unit of the still picture data.

21. A recording apparatus for recording audio data and video data and management information, comprising:

an input processing module to receive and to encode video data including still pictures and audio data;

an output processing module to decode and output the video data and the audio data; and a controller managing the still pictures and the audio data related to the still pictures using a playlist at least by creating management information to link the still pictures and the audio data by the playlist and recording the still pictures and the audio data in separate files, wherein the playlist includes first navigation information for the audio data, and second navigation information for the still pictures, the first navigation information includes a file name of the audio data, and the second navigation information is provided by one or more playitems of the playlist, wherein the playlist includes a collection of playitems, each of the playitems being related to at least one still picture.

22. The recording apparatus of claim 21, wherein the input processing module includes:

a first input switching unit to receive input video data,
a second input switching unit to receive input audio data,
a still picture video encoder to encode the input video data,
a still picture audio encoder to encode the input audio data,
a movie video encoder to encode the input video data,
a movie audio encoder to encode the input audio data,
an MPEG 2 multiplexer multiplexes the video data and the audio data encoded by and received from the movie video encoder and the movie audio encoder to produce MPEG 2 stream,
a formatter to receive the MPEG 2 stream, and
a DVR encoding DSP,
wherein the formatter segments or groups the encoded input video data and/or the encoded input audio data to yield successive data units, adds necessary head information to each data unit, and transmits them sequentially to the DVR encoding DSP.

23. The recording apparatus of claim 21, wherein the output processing module includes:

a DVR decoding DSP,
a parser,
an MPEG 2 demultiplexer,
a still picture video decoder to decode video data from the parser,
a still picture audio decoder to decode audio data from the parser,
a movie video decoder to decode video data from the parser and the MPEG 2 demultiplexer,
a movie audio decoder to decode audio data from the parser and the MPEG 2 demultiplexer,
a first input switching unit to output decoded video data, and
a second input switching unit to output decoded audio data.

* * * * *